United States Patent [19]

Ohto et al.

[11] 3,865,588

[45] Feb. 11, 1975

[54] PLANOGRAPHIC PLATE WITH A POLYMERIZABLE ORGANOPOLYSILOXANE COMPOUND

[75] Inventors: Michihiro Ohto, Tokyo; Atsumi Noshiro, Yokohama; Tetsuya Mayuzumi; Toji Fujino, both of Annaka, all of Japan

[73] Assignees: Dai Nippon Printing Co., Ltd.; Shinetsu Chemical Co., both of Tokyo, Japan

[22] Filed: Feb. 22, 1972

[21] Appl. No.: 226,951

[30] Foreign Application Priority Data

Feb. 20, 1971 Japan .................................. 46-7737
Mar. 5, 1971 Japan .................................. 46-11338
Sept. 1, 1971 Japan .................................. 46-67212
Sept. 10, 1971 Japan .................................. 46-70177

[52] U.S. Cl. .................. 96/33, 96/35.1, 204/159.13
[51] Int. Cl. ............................................. G03f 7/02
[58] Field of Search ....................... 96/33, 115, 35.1; 204/159.13; 260/448.2 B

[56] References Cited

UNITED STATES PATENTS

| | | | |
|---|---|---|---|
| 2,882,262 | 4/1959 | Smith | 96/115 P |
| 2,922,806 | 1/1960 | Merker | 260/448.2 |
| 3,069,378 | 12/1962 | Prober | 204/159.13 |
| 3,511,178 | 5/1970 | Curtin | 96/33 |
| 3,728,123 | 4/1973 | Gipe | 96/33 |

*Primary Examiner*—Norman G. Torchin
*Assistant Examiner*—John L. Goodrow

[57] ABSTRACT

When a base plate or substrate coated with an organopolysiloxane composition at least one kind of organopolysiloxane having an unsaturated radical, represented by the general formula:

$$\underset{\phantom{O}}{\overset{R^1}{\underset{|}{HC}}}=\overset{R^2}{\underset{|}{C}}-\underset{O}{\overset{\|}{C}}-O-$$

(where $R^1$ is a hydrogen atom or a phenyl radical or a halogen substituted phenyl radical; $R^2$ is a hydrogen atom or a methyl radical) is exposed to light or electron rays through a positive pattern mounted on it and then developed and fixed, there will be given a planographic printing plate in whose use there will be no need of employing dampening solutions.

17 Claims, 4 Drawing Figures

PLANOGRAPHIC PLATE WITH A POLYMERIZABLE ORGANOPOLYSILOXANE COMPOUND

SUMMARY OF THE INVENTION

Figure 1:
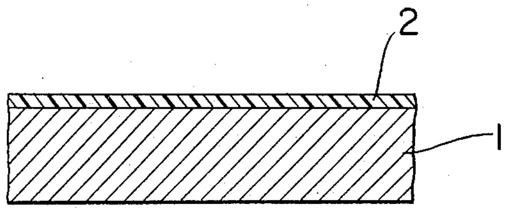

The present invention relates to planographic printing plates in whose use there will be no need of employing dampening solution, and method for preparing such printing plates.

Unlike in letter-press printing or in gravure printing, in planographic printing the printing plate employed is provided with no areas either raised above or depressed below the plate surface so as to define the image areas, but the image- and non-image areas lie substantially in the same plane. Lithography is the best known form of planography, and a successful process of planographic printing. Lithographic printing works on the theory that water and oil are immiscible: in the first place the non-image areas are made water-receptive (hydrophilic) either by chemical or mechanical treatment, and at the same time the image areas are made oil-receptive (organophilic) by rolling over fatty resin or having a photograph printed on them. Subsequently, the plate is dampened with fountain solutions, which wets the background or non-image areas, and then ink is rolled over the plate. The ink coats the image areas wich are organophilic but it is repelled from the water-dampened, non-image areas, so that by transferring it to a copy sheet the desired printing can be accomplished.

One of the difficulties inherent in practicing this planographic printing is that the dampening solutions applied to the plate flows back into the inking rollers on the press, during the course of the printing run, causing emulsification of the ink. In addition to back flowing, the dampening solutions also tends to flow forward over the copy sheet, soiling it, and causing it to curl and change in dimension. This creates special difficulties in securing accurate registration in multiple color printing where the copy sheet undergoes several trips through the presses. Control of the delicate balance between ink and dampening solutions, which is necessary in order to secure image fidelity and uniformity, is difficult to maintain, and the occurrence of variation in color tone of the press can hardly be prevented.

For the purpose of overcoming the difficulties, attempts have been made to develop planography in which no dampening solution is required, but no satisfactory solution of practical value has been given as yet. For example, a proposal has been made to provide a planographic printing plate comprising a base plate or substrate of aluminum, in which the ink-receptive areas are formed by applying, to a surface of the base plate, diazo-type photosensitive composition and dimethylpolysiloxane rubber so that their layers may be formed on it, and then to expose the thus treated base plate to light through a positive transparency mounted on it, thereby giving a latent image. The surface of the plate is then developed to remove, in the first place, the unexposed part of diazo photosensitive layer, and then the unexposed part of dimethylpolysiloxane rubber layer down to the underlying metal, leaving behind the exposed part of the diazo-photosensitive layer which has been made insoluble. (See British Pat. No. 1,146,618.) Others have attempted to provide a planographic printing plate which is prepared by forming, sucessively, on an aluminum base plate, a diazo photosensitive layer, an adhesive layer and a silicone rubber layer, which plate, when exposed to light through a negative transparency mounted on it, and developed by utilizing photodecomposition of the photosensitive layer and stripped of the photoexposed silicone rubber layer, gives the desired printing plate. (See U.S. Pat. No. 3,511,178.) But in both cases, the presence of a non-photosensitive silicone rubber layer between the diazo photosensitive layer and the positive or negative transparency makes it difficult for the fidelity and uniformity of the image on the positive or negative transparency to be secured in reproduction. Furthermore, the removal of the silicone rubber layer from the plate is conducted by utilizing the change in solubility in solvent of the photosensitive layer, so that the image formed of it may not be well-cut on the edge, and be lacking in sharpness, which is a serious weakpoint. As was mentioned before, the printing plate in question has to be prepared by successively forming two or three layers on the surface of the base plate, and the complicated process will add to the difficulties.

An object of the invention is to provide planographic printing plates and method for preparing them, free from the disadvantages described above, and another object of the invention is to provide a method for industrially preparing with ease such planographic printing plates as have images sharp in the edge, and excellent in resolving power, consequently clear-cut and reproducible in themselves, and whose use there is no need of employing dampening solutions.

According to one aspect of the present invention, there is provided quite easily a planographic printing plate comprising a base plate or substrate having ink-receptive areas and ink-repellent areas thereon, wherein said ink-repellent areas which represent non-image areas are formed by a layer given by polymerizing and curing composition containing at least one kind of organopolysiloxanes (hereinafter referred to as Siloxane A), having an unsaturated radical, represented by the general formula:

$$HC(R^1) = C(R^2) - C(=O) - O - \qquad (1)$$

(where $R^1$ is a hydrogen atom or a phenyl radical or a halogen substituted phenyl radical, and $R^2$ is a hydrogen atom or a methyl radical) which Siloxane A has been applied to the surface of said base plate or substrate. The printing plate of the invention can be easily prepared by applying to the surface of any base plate a polymerizable composition containing at least one kind of said Siloxane A as its main component, and exposing to light or electron rays the treated substrate through a positive pattern mounted on it, and then developing and fixing the negative pattern on it.

Figure 2:
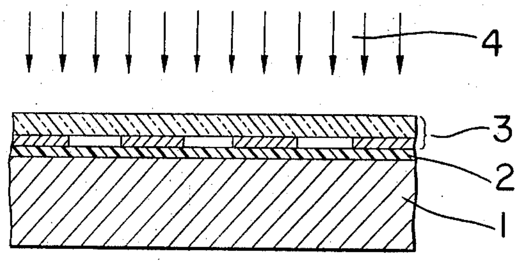
Figure 3:
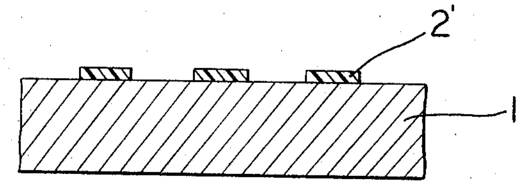

The invention will now be described by way of example with reference to the accompanying drawings. As shown in FIG. 1, there is first provided a plate or substrate 1, whose surface is coated, from 3 to 15$\mu$ thick, either with a photopolymerizable composition comprising at least one kind of said Siloxane A, a sensitizer, a solvent, and dried to give a coating layer 2, or with an electron-ray-polymerizable composition comprising at least one kind of said Siloxane A and a solvent, and dried to give a coating layer 2. Subsequently, as shown in FIG. 2, the plate is mounted in close contact with a positive pattern 3, representing letters, marks, figures or pictures, and exposed to light or electron rays 4, and then developed and fixed. In this way, as shown in FIG. 3, the coating layer 2 is caused to harden in the photo- or electron-ray-exposed areas to form non-image areas of strong and insoluble film, superior in heat-, chemical-, and corrosion-resistance, while in the unexposed areas, the film layer 2 is dissolved with some solvent suitable for the purpose and is completely removed so that on the base plate or substrate 1 there remains nothing but the photo- or electron-ray-polymerized and cured coating layer 2', which, together with the base plate forms the desired planographic printing plate of the present invention.

Said base plate or substrate 1 employed in preparing the printing plate of the invention may be of any material usually employed for making known planographic printing plates, and such a material is exemplified by metal plates e.g., copper plates, aluminum plates, stainless steel plates, zinc plates, iron plates, nickel-plated copper plates, nickel-plated iron plates, and chromium-plated iron plates; and plastic plates. The surface of the base plate or substrate must be made smooth so that the polymerizable composition containing Siloxane A may be applied evenly to it, and it is desirable that the thickness of the base plate should be uniform. Before the polymerizable composition is applied to it, the surface of the base plate must be thoroughly cleaned by the method known to the art lest oils or dirts attached to it or oxides of metals covering it should cause uneven application of the polymerizable composition or pinholes in the coating film forward of the polymerizable composition. Sometimes due to the presence of some foreign matters on the surface of the base plate, the coating film itself may get peeled from the base plate. If necessary, in order to guarantee better adhesion of the coating film or layer, the surface of the base plate is even made properly rough, or some primer may be spread over it before the application of the polymerizable composition. Such a primer is exemplified by silanes, e.g., vinyltris ($\beta$-methoxyethoxy) silane, $\gamma$-glycidoxypropyltrimethoxy silane, $\gamma$-methacryloxypropyltrimethoxy silane, n-(trimethoxysilylpropyl) ethylene diamine, and $\gamma$-aminopropyltriethoxy silane, used either singly or in mixture, and partially hydrolyzed or partially cohydrolyzed products thereof. The application of the primer may be conducted by any known method such as revolution coating, spray coating or coating with a coating rod or with a brush.

The photopolymerizable composition employed in practicing the method of the invention is prepared merely by mixing at least one kind of Siloxane A, a sensitizer, and a solvent, and the electron-ray-polymerizable composition employed in it is prepared by merely mixing at least one kind of Siloxane A and a solvent. If necessary, such additives as thermal polymerization inhibitors and fillers may be added to either of the mixtures. It is preferable that the viscosity of the mixture may be so controlled as to be suitable for application.

To give more detailed description of the above-mentioned polymerizable composition, siloxane A contained in the compositions may be exemplified by an organopolysiloxane having in its molecule at least one polymerizable organic silicon radical, such as represented by the general formula:

$$\begin{array}{l} \quad R^1\ R^2 \qquad\qquad\quad R^4_{\ a} \\ HC{=}C{-}C{-}O{-}R^3{-}SiX_bO_{\frac{3-a-b}{2}} \end{array} \qquad (2)$$

(where $R^1$ is a hydrogen atom or a phenyl radical or a halogen substituted phenyl radical; $R^2$ is a hydrogen atom or a methyl radical; $R^3$ is a divalent hydrocarbon radical or a halogen substituted divalent hydrocarbon radical, having from 1 to 10 carbon atoms; $R^4$ is a monovalent hydrocarbon radical or a halogen substituted hydrocarbon radical, having from 1 to 10 carbon atoms; X is a hydroxyl radical or an alkoxy radical having from 1 to 4 carbon atoms; *a* is a number representing 0 or 1, and *b* is also a number representing 0, 1 or 2, where $(a+b)=0$, 1 or 2, ) or by the general formula:

$$\begin{array}{l} \quad R^1\ R^2 \qquad\qquad\qquad\quad R^4_{\ m} \\ HC{=}C{-}\underset{\underset{O}{\|}}{C}{-}O{-}(R^3{-}O)_l{-}SiX_nO_{\frac{3-m-n}{2}} \end{array} \qquad (3)$$

(wherein $R^1$, $R^2$, $R^3$, $R^4$ and X are as described above, *l* is a number representing 0 or 1, and *m* and *n* are a number representing 0, 1 or 2, where $(m+n)=0$, 1 or 2).

The polymerizability of these organopoly siloxanes is due to the presence of an organic radical represented by the general formula:

$$\begin{array}{l} \quad R^1\ R^2 \\ HC{=}C{-}\underset{\underset{O}{\|}}{C}{-}O{-} \end{array} \qquad (1)$$

(wherein $R^1$ and $R^2$ are as defined above). Such organic radical is exemplified by acryloxy radical, methacryloxy radical, cinnamoyloxy radical or halogenated cinnamoyloxy radical.

On the other hand, the divalent hydrocarbon radical or halogen substituted divalent hydrocarbon radical, having from 1 to 10 carbon atoms, each represented by $R^3$ in the general formula (2) or (3), is exemplified by alkylene radical such as methylene, propylene, butylene, or 2,2-dimethyl-1, 3-propyl radical; arylene radical such as phenylene radical; alkarylene radical such as phenylethylene radical; or halogen substituted radical thereof. The monovalent hydrocarbon radical or the halogen substituted hydrocarbon radical, having from 1 to 10 carbon atoms each represented by $R^4$ in the general formula (r) or (3) is exemplified by alkenyl radical such as vinyl radical or allyl radical; cycloalkenyl radical such as cyclohexenyl radical; alkyl radical such as methyl, ethyl, propyl, or octyl radical; aryl radical such as phenyl radical; aralkyl radical such as benzyl or phenylmethyl radical; alkaryl radical such as styryl or tolyl radical; or halogen substituted radical thereof such as chloromethyl radical, trichloroethyl radical, perfluorovinyl radical, trifluoropropyl radical or perchlorotolyl radical.

Said organopolysiloxane must be an organic silicon compound, having at least one kind of polymerizable organic silicon radical and represented by the general formula (2) or (3) but these radicals may be bonded by siloxane-bond (Si—O—Si) to an organic compound containing a unit represented by the general formula:

$$R^5_c SiX_d O_{\frac{4-c-d}{2}} \quad (4)$$

(wherein $R^5$ is, like $R^4$ mentioned above, a monovalent hydrocarbon radical or a halogen substituted hydrocarbon radical, having from 1 to 10 carbon atoms; X is as mentioned above; *c* and *d* are each a number representing 0, 1, 2 or 3, where $(c+d)$=0, 1, 2 or 3) or containing a unit represented by the general formula:

$$R^5_j SiX_k O_{\frac{4-j-k}{2}} \quad (5)$$

(wherein $R^5$ is, like $R^4$ mentioned above, *j* and *k* are each a number representing 0, 1, 2 or 3, where $(j+k)$=0, 1, 2 or 3). In this case, the organic silicon compound consisting of the unit represented by the general formula (4) or (5) may be oily, rubbery or resinous is appearance, and straight-chained, side-chained, or cyclic in structure.

The organopolysiloxane having at least one radical represented by the above-given general formula (2), and composing the compositions of the invention, can be prepared by known methods, which may be generally classified into two groups as given below.

By the first method, a polymerizable organic silicon monomer represented by the general formula:

$$HC{=}\underset{R^1}{C}-\underset{\overset{\|}{O}}{\overset{R^2}{C}}-O-R^3-\overset{R^4_a}{Si}Z_{3-a} \quad (6)$$

(where $R^1$, $R^2$, $R^3$, $R^4$ and *a* are as defined above, and Z is a halogen atom, an acetoxy radical, a hydroxyl radical or an alkoxy radical having from 1 to 4 carbon atoms), is reacted with silane or siloxane represented by the general formula:

$$R^5_c-Si-Y_e O_{\frac{4-c-e}{2}} \quad (7)$$

(where $R^5$ and *c* are as defined above, Y is a halogen atom, acetoxy radical, a hydroxyl radical or an alkoxy radical having from 1 to 4 carbon atoms, and *e* is a number representing 1, 2, 3 or 4). Hereinafter said method shall be referred to as the Monomer Method.

By the second method, silane or siloxane represented by the general formula:

$$(Q-R^3)_f-\overset{H_g}{\underset{R^4_a}{Si}}-Y_e O_{\frac{3-a-c}{}} \quad (8)$$

(where $R^3$, $R^4$, Y *a* and *e* are as defined above; Q is a halogen atom; *f* and *g* are each a number representing 0 or 1, where $(f+g)$=1,) is reacted with silane or siloxane represented by the above-given general formula (7), thereby synthesizing organopolysiloxane having at least one radical represented by:

$$(Q-R^3)_f-\overset{H_g}{\underset{R^4_a}{Si}}-X_b O_{\frac{3-a-b}{2}} \quad (9)$$

(where Q, $R^3$, $R^4$, X, *a*, *b*, *f* and *g* are as described above), and subsequently reacting said organopolysiloxane with the organic compound having the photopolymerizable organic radical represented by the general formula (1), which method shall be referred to as the Polymer Method hereinafter.

The polymerizable organic silicon monomer represented by the general formula (6) and employed the Monomer Method can be synthesized by various methods already known. For example, it is prepared by subjecting to the addition reaction between (*i*) a compound having an unsaturated radical represented by the general formula (1) and an aliphatic unsaturated bond, and (ii) silane represented by the general formula:

$$\overset{R^4_a}{HSi}Z_{3-a} \quad (10)$$

(where $R^4$, Z and *a* are as described above), in the presence of a catalyst such as chloroplatinic acid, or by subjecting to dehalogenated salt between (i) an alkali metal salt or tertiary amine salt of carboxylic acid, having an unsaturated radical represented by the general formula (1) and (ii) organoalkoxy silane represented by the general formula:

$$Q-R^3-\overset{R^4_a}{Si}(OR^6)_{3-a} \quad (11)$$

(where Q, $R^3$, $R^4$ and *a* are as described above; and $R^6$ is a monovalent hydrocarbon radical having from 1 to 4 carbon atoms.) In this case the compound having in its structure an unsaturated radical represented by the general formula (1) and an aliphatic unsaturated bond is exemplified by an allyl ester such as acrylic acid, methacrylic acid, cinnamic acid or halogen substituted cinnamic acid; or ethylene glycol diacrylate, ethylene glycol dimethylacrylate, ethylene glycol dicinnamate, propylene glycol-diacrylate or -trimethacrylate, neopentyl glycol dimethacrylate, trimethylethane trimethacrylate, trimethylpropane trimethacrylate or trimethylethane tricinnamate. The silane represented by the general formula (10) and employed by the above-given method is selected from the group consisting of chlorosilanes such as trichlorosilane, methyldichlorosilane, ethyldichlorosilane, propyldichlorosilane, isopropyldichlorosilane, butyldichlorosilane, hexyldichlorosilane, octyldichlorosilane, 2-ethylhexyldichlorosilane, phenyldichlorosilane, tolyldichlorosilane, cyclohexyldichlorosilane, chloromethyldichlorosilane, γ-bromopropyldichlorosilane, γ-trifluoropropyldichlorosilane, chlorophenyldichlorosilane, trifluoromethylphenyldichlorosilane, dimethylmonochlorosilane, methylethylmonochlorosilane, methylphenylmonochlorosilane, ethyltolylmonochlorosilane, methyltrifluoropropylmonochlorosilane, ethylcyclohexylmonochlorosilane and diphenylmonochlorosilane; and various silanes in which a part or the whole of the chlorine atoms directly bonded to the silicon atoms in said chlorosilanes are replaced by other halogen atoms, acetoxy radicals, hydroxyl radicals or alkoxy radicals having from 1 to 4 carbon atoms, e.g., trimethoxysilane, chlorodiethoxysilane, methyldibutoxylsilane, isopropyldiacetoxysilane, phenylmethylsilanol, ethyldibromosilane, ethoxydiacetoxysilane, dimethyliodidosilane, phenylisopropoxybromosilane, phenyldisilanol, cyclohexyldiacetoxysilane, tertiary butyldibromosilane, tolyldifluorosilane or tolylfluoropropyldiethoxysilane.

On the other hand, the alkali metal salt or tertiary amine salt of the carboxylic acid having an unsaturated radical represented by the general formula (1) is exemplified by sodium salt, potassium salt, pyridium salt, dimethylaniline salt or triethylamine salt of acrylic acid, methacrylic acid, cinnamic acid or halogen substituted cinnamic acid. The organoalkoxysilane represented by the general formula (11) and employed by the same method is selected from the group consisting of chloromethyl trimethoxysilane, bromomethyltrimethoxysilane, chloromethylethyldimethoxysilane, iodomethylmethyldiethoxysilane, chloromethyltriisopropoxysilane, β-bromoethyltriethoxysilane, β-chloroethylmethyldimethoxysilane, γ-chloropropyltrimethoxysilane, γ-chloropropyltriethoxysilane, γ-bromopropylmethyldibutoxysilane, γ-iodopropyldiisopropoxysilane, γ-bromoisobutyldiphenylethoxysilane, ζ-chlorobutyltrimethoxysilane, β-bromoethylphenyltriethoxysilane, chloromethylallyldimethoxysilane, chloromethylvinyldimethoxysilane, γ-chloropropylvinyldiethoxysilane, γ-bromopropylvinylphenylethoxysilane, or ζ-iodobutylallyldiisopropoxysilane.

The polymerizable organic silicon monomer represented by the general formula (6) prepared by said Monomer Method from the above-given material is exemplified by acryloxymethyltrichlorosilane, γ-methacryloxypropyltrichlorosilane, ζ-methacryloxybutyltriethoxysilane, or -trichlorosilane, γ-acryloxypropylmethyldimethoxysilane, -methyldichlorosilane or -phenyldichlorosilane, methacryloxymethyl trihydroxysilane, γ-methacryloxypropylmonomethoxydichlorosilane, cinnamoyloxymethyltrichlorosilane, halogenocinnamoyloxymethyltrimethoxysilane, γ-cinnamoyloxypropyl-trimethoxysilane or -trichlorosilane, ζ-halogen substituted cinnamoyloxybutyl-trihydroxysilane, or -trichlorosilane, or γ-methacryloxypropyltetramethoxydisiloxane, mono-addition compounds of trichlorosilane to ethyleneglycolacrylate or -methacrylate, mono-addition compounds of methyldichlorosilane to triethyleneglycoldimethacrylate, mono-addition compounds of trichlorosilane to neo-pentylglycoldimethacrylate, mono-addition compounds of trichlorosilane to 1, 3-butyleneglycol-dimethacrylate, or by various silanes in which a part or the whole of the chlorine atoms directly bonded to silicon atoms in the chlorosilanes are replaced with other halogen atoms, acetoxy radicals, hydroxyl radicals or alkoxy radicals, having from 1 to 5 carbon atoms, or partial condensate of those silanes. Further, the silane or siloxane given by the general formula (11) and employed by the above-given Monomer Method is exemplified by chlorosilanes such as tetrachlorosilane, methyltrichlorosilane, ethyltrichlorosilane, propyltrichlorosilane, 2-ethylhexyltrichlorosilane, vinyltrichlorosilane, allyltrichlorosilane, cyclohexyltrichlorosilane, phenyltrichlorosilane, benzyltrichlorosilane, styryltrichlorosilane, tolyltrichlorosilane, chloromethyltrichlorosilane, γ-trifluoropropyltrichlorosilane, γ-bromopropyltrichlorosilane, parachlorotolyltrichlorosilane, dimethyldichlorosilane, methylethyldichlorosilane, methylbutyldichlorosilane, methylcyclohexyldichlorosilane, methylphenyldichlorosilane, methylvinyldichlorosilane, methylallyldichlorosilane, methyltolyldichlorosilane, γ-trifluoropropylmethyldichlorosilane, chloromethylphenyldichlorosilane, γ-chloropropylphenyldichlorosilane, diphenyldichlorosilane, phenylvinyldichlorosilane, phenylcyclohexyldichlorosilane, trimethylchlorosilane, methyldiphenylchlorosilane, diethylphenylchlorosilane, triphenylchlorosilane, dimethylphenylchlorosilane, dimethylchloromethylchlorosilane, γ-trifluoropropyldimethylchlorosilane, dicyclohexylchlorophenylchlorosilane, ethylisobutyltolylchlorosilane or vinylethylphenylchlorosilane; or by various silanes in which a part or the whole of the chlorine atoms directly bonded to silicon atoms in the chlorosilanes are replaced by other halogen atoms, acetoxy radicals hydroxyl radicals alkoxy radicals having from 1 to 4 carbon atoms or metaloxy salt of alkali metal; or siloxanes obtained by subjecting them to cohydrolysis, dehydration, dehydrohalogenation, deacetylation, dealcoholization, dealkyl acetylation or dealkyl halogenation. The siloxane represented by the general formula (7) can be oily, rubbery, or resinous in appearance, and straight-chained, side-chained or cyclic in structure, so long as it contains, at least one chlorine atom, or acetoxy radical or hydroxyl radical, or alkoxy radical having from 1 to 4 carbon atoms directly bonded to a silicon atom contained in the molecule. Furthermore, said siloxane can be either of low molecular weight having several silicon atoms or of high molecular weight with hundreds or thousands of silicon atoms bonded together. But, these siloxanes must contain at least one chlorine atoms, hydroxyl radical, alkoxy radical having from 1 to 4 carbon atoms or alkali metaloxy radical, each directly bonded to silicon atoms in the molecule.

There are many ways in which the organopolysiloxane having a radical represented by the general formula (2) is prepared by reacting polymerizable organic silicon monomer represented by the above-given general formula (6) with silane or siloxane represented by the general formula (7). For example, according to one of them the mixture of (a) the polymerizable organic silicon monomer represented by the general formula (6) and (b) the silane or siloxane represented by the general formula (7) is cohydrolyzed and then subjected to condensation reaction. According to another, when both (a) the polymerizable organic silicon monomer represented by the general formula (6) and (b) the silane or siloxane represented by the general formula (7) possess silanol radicals, they are mixed and subjected to dehydration, in which, in order to accelerate the reaction, it is preferable to employ a well-known catalyst such as sulfuric acid, phosphoric acid, trichloro acetic acid, isopropyl orthotitanate, dibutyltin dilaulate, or sodium ethylate. In the case, if one of (a) the polymerizable organic silicon monomer represented by the general formula (6) and (b) the silane or siloxane represented by the general formula (7) possesses a halogen atom or an acetoxy radical bonded to a silicon atom, and the other possesses a silanol radical bonded to a silicon atom, those are mixed and subjected to dehydrohalogenation or deacetylation, in the course of which hydrogen halide or acetic acid generated had better be either taken out of the reaction system or inactivated by employing an acid acceptor such as pyridine of triethylamine. If one of (a) the polymerizable organic silicon monomer represented by the general formula (6) and (b) the silane or siloxane represented by the general formula (7) possesses an alkoxyl radical bonded to a silicon atom, and the other possesses silanol bonded to a silicon atom, the two are mixed and subjected to dealcoholization, in the course or which the generated alcohol had better be taken out of the reaction system. In order to accelerate the reaction, it is preferable to employ some well-known catalyst such as sulfuric acid, phosphoric acid, paratoluenesulfonic acid, isopropyl titanate, sodium ethylate or potassium ethylate. Still further, if either (a) the polymerizable organic silicon monomer represented by the general formula (6) and (b) the silane or siloxane represented by the general formula (7) possesses an alkoxy radical bonded to a silicon atom, and the other possesses a halogen atom or an acetoxy radical bonded to a silicon atom, the two are mixed and subjected to dehalogenated alkylation or dealkyl acetylation, in the course of which alkyl halide or alkyl acetate generated is taken out of the reaction system. In order to accelerate the reaction, some catalyst such as zinc chloride or ferric chloride had better be employed. Moreover, if one of (a) the polymerizable organic silicon monomer represented by the general formula (6) and (b) the silane or siloxane represented by the general formula (7) possesses an halogen atom or an acetoxy radical bonded to a silicon atom, and the other possesses a alkali metaloxy radical bonded to a silicon atom, the two are mixed and subjected to dehalogenated alkalimetalsalt reaction or dealkalimetal acetate reaction. The reaction can proceed violently only by admixing the two.

For the purpose of carrying out each of the reactions easily, an inert organic solvent in a proper amount had better be added to the reaction system. Such a solvent is exemplified by methyl ethyl ketone, methyl isobutyl ketone, benzene, toluene, xylene, tetra chloromethan, trichloroethane or tetrachloroethane. In order to accelerate the reaction more advantageously, it is sometimes desirable to raise the temperature of the reaction system. In such a case, it is preferable to add some thermal polymerization inhibitor such as quinones, e.g., hydroquinone or benzoquinone; amine salts; or hydrazine salts, for the protection of the organic radical represented by the general formula (1) which is the polymerizable organic silicon monomer represented by the general formula (6).

The same reaction system as employed in practicing the Monomer Method may be employed in carrying out the Polymer Method. In reacting (a) the silane or siloxane represented by the general formula (8) with (b) the silane or siloxane represented by the general formula (7), the mixture may be subjected to any system of reaction described with regard to the Monomer Method, such as cohydrolysis, dehydration, dehydrogen halogenation, deacetylation dealcoholization, dealkyl acetylation or dealkyl halogenation, depending upon the kind of the reaction radical contained in the silane or siloxane represented by the general formula (7) and (8). The reaction condition and the kind of the catalyst to be employed may be selected just as in the case of the Monomer Method. The silane or siloxane represented by the general formula (8) is exemplified by chlorosilanes such as trichlorosilane, methyldichlorosilane, ethyldichlorosilane, propyldichlorosilane, isopropyldichlorosilane, butyldichlorosilane, hexyldichlorosilane, octyldichlorosilane, 2-ethylhexyldichlorosilane, phenyldichlorosilane, tolyldichlorosilane, cyclohexyldichlorosilane, chloromethyldichlorosilane, γ-bromopropyldichlorosilane, γ-trifluoropropyldichlorosilane, chlorophenyldichlorosilane, trifluoromethylphenyldichlorosilane, dimethylmonochlorosilane, methylethylmonochlorosilane, methylphenylmonochlorosilane, ethyltolylmonochlorosilane, methyltrifluoropropylmonochlorosilane, ethylcyclohexylmonochlorosilane, diphenylmonochlorosilane, chloromethyltrichlorosilane, bromomethyltrichlorosilane, iodomethyltrichlorosilane, β-bromoethyltrichlorosilane, β-chloroethyltrichlorosilane, γ-chloropropyltrichlorosilane, γ-bromopropyltrichlorosilane, γ-iodopropyltrichlorosilane, γ-bromoisobutyltrichlorosilane, ζ-chlorobutyltrichlorosilane, β-bromoethylphenyltrichlorosilane, chloromethyldichlorosilane, bromomethyltolyldichlorosilane, bromomethylphenyldichlorosilane, ζ-iodobutylphenyldichlorosilane, γ-chloropropyldimethylchlorosilane, or chlorophenyltrichlorosilane; or various silanes where a part or the whole of the chlorine atoms directly bonded to the silicon atoms are replaced by other halogen atoms or acetoxy radicals of hydroxyl radicals or alkoxy radicals having from 1 to 4 carbon atoms; or siloxanes prepared by subjecting to cohydrolysis, dehydration, dehydrogen halogenation, deacetylation or dealcoholization, dealkyl acetylation or dealkyl halogenation, said silanes obtained by substitution. Such siloxanes may be oily, rubbery resinous in appearance, and straight-chained, side chained or cylic in structure. Furthermore, said siloxanes can be either of low-molecular weight having several silicon atoms or of high-molecular weight having hundreds or thousands of silicon atoms bonded together, so long as they contain a halogen atom bonded to at least one silicon atom, or an acetoxy radical or a hydroxyl radical, or an alkoxy radical having from 1 to 4 carbon atoms. As the silanes or siloxanes represented by the general formula (7) may be employed the silanes or siloxanes mentioned in the above-given Monomer Method.

By the Polymer Method, the organopolysiloxane having at least one radical represented by the general formula (9) and prepared as given above is to be reacted with an organic compound having a polymerizable organic radical represented by the general formula (1) in order to prepare organopolysiloxane having a radical represented by the general formula (2). As the organic compound having a polymerizable organic radical represented by the general formula (1), can be employed any of the compounds employed in practicing the Monomer Method for obtaining polymerizable organic silicon monomer, represented by the general formula (6), which compounds possess in one part of the structure a polymerizable organic radical represented by the general formula (1), and in the other, an aliphatic unsaturated bond, or an alkali metal salt or a tertiary amine salt of the carboxylic acid having a polymerizable organic radical represented by the general formula (1). Said reaction is carried out by subjecting to dehalogenated salt reaction, the mixture of the polyorganosiloxane having at least one radical represented by the general formula (9) and the compound having the polymerizable radical represented by the general formula (1), as dissolved in dimethylformamide, toluene, xylene, methylethyl ketone or dibutyl ether, or more preferably in the presence of a catalyst, such as tertiary amine or hydrochlororate thereof, or pyridine, or by subjecting said mixture to addition reaction in the presence of chloroplatinic acid.

As the alkali metal salt or tertiary amine salt of carboxylic acid having an unsaturated radical represented by the general formula (1), or the compound having an unsaturated radical represented by the general formula (1) in one part of its structure, and a aliphatic unsaturated bond in the other, any of the compounds employed in practicing the Monomer Method can be employed in the similar way.

The organopolysiloxane having at least one polymerizable organic silicon radical represented by the general formula (3) can be prepared by the known method, for example, by reacting an unsaturated compound represented by the general formula:

$$HC(R^1)=C(R^2)-C(=O)-O\,(R^3-O)_e\,W \qquad (12)$$

(where $R^1$, $R^2$, $R^3$ and $e$ are as described before, and W is a hydrogen atom or an alkali metal), with an organopolysiloxane represented by the general formula:

$$V\overset{R^4_m}{\overset{|}{Si}}X_nO_{\frac{3-m-n}{2}} \qquad (13)$$

(where $R^4$, X, $m$ and $n$ are as described before, V is a hydrogen atom, a halogen atom, acetoxy radical or alkoxy radical having from 1 to 4 carbons.) The unsaturated compound represented by the formula (12) is exemplified by acrylic acid, methacrylic acid, cinnamic acid, halogen-substituted cinnamic acid, and sodium salt, potassium salt and calcium salt thereof, hydroxymethyl acrylate, 2-hydroxyethyl acrylate, 3-hydroxypropyl acrylate, 3-chloro-2-hydroxypropyl acrylate, p-hydroxyphenyl acrylate, hydroxymethyl methacrylate, 2-hydroxyethyl methacrylate, 3-hydroxypropyl methacrylate, 3-chloro-2-hydroxypropyl methacrylate, 3-hydroxyisobutyl methacrylate, p-hydroxyphenyl methacrylate, p-hydroxyethyl methacrylate, 2-hydroxyethyl cinnamate, 3-hydroxypropyl cinnamate, 4-hydroxybutyl cinnamate, and 3-chloro-2-hydroxypropyl cinnamate, and alkali metals alkolates thereof, glycidyl methacrylate, glycidyl acrylate, glycidyl cinnamate, glycidyl halogeno cinnamate. And the organopolysiloxane represented by the general formula (13) is exemplified, for example, by methylmethoxypolysiloxane, methylphenylethoxypolysiloxane, methylhydrogenpolysiloxane, methylvinylethoxypolysiloxane, ethylhydrogenpolysiloxane, methyloctylhydrogenpolysiloxane, methylchlorophenylmethoxypolysiloxane, tetramethyldimethoxydisiloxane, tetramethyldihydrogendisiloxane, octamethyldiphenyldiethoxysiloxane, hexamethyldiacetoxytrisiloxane, $\alpha,\omega$-dichloromethylpolysiloxane, $\alpha,\omega$-dichloromethylphenylpolysiloxane, $\alpha,\omega$-diacetoxymethylethylpolysiloxane, $\alpha,\omega$-dibutoxymethylphenylsiloxane, and methyltrifluoropropylhydrogen polysiloxane.

There are many ways in which the organopolysiloxane having at least one polymerizable organic silicon radical, represented by the general formula (3) is prepared by reacting the unsaturated compound, represented by the general formula (12) with the organopolysiloxane represented by the general formula (13). For example, when W in the general formula (12) is a hydrogen atom, and V in the general formula (13) is also a hydrogen atom, the unsaturated compound represented by the general formula (12) is mixed with the organopolysiloxane represented by the general formula (13) so as to be dehydrated. In order to accelerate the reaction, any catalyst usually employed in dehydration, such as metallic zinc powder or tertiary amine, can be employed. When W in the general formula (12) is a hydrogen atom and V in the general formula (13) is a halogen atom or acetoxy radical, the unsaturated compound represented by the general formula (12) is mixed with the organopolysiloxane represented by the general formula (13) so as to be dehydrohalogenized or deacetated. In this case, hydrogen halide or acetic acid, which is by-produced, is either taken out of the system or removed by means of a trapping agent.

In still another case where W in the general formula (12) is a hydrogen atom and V in the general formula (13) is alkoxy radical having from 1 to 4 carbons, the unsaturated compound represented by the general formula (12) is mixed with the organopolysiloxane represented by the general formula (13) so as to carry out ester-change reaction. In this case, in order to accelerate the reaction, some of the known catalysts employed in the ester-exchange reaction such as sodium ethylate, isopropyl orthotitanate, sulfuric acid, acetic trifluoride or triethyl amine, is used.

When W in the general formula (12) is an alkali metal and V in the general formula (13) is a halogen atom or acetoxy radical, the unsaturated compound represented by the general formula (12) is mixed with the organopolysiloxane represented by the general formula (13) so as to carry out dealkali metal salt in order to obtain the desired organopolysiloxane.

In case W in the general formula (12) is epoxy radical and V in the general formula (13) is a halogen atom or acetoxy radical, by mixing the unsaturated compound represented by the general formula (12) with the organopolysiloxane represented by the general formula (13), the epoxy radical will be cleaved and there will be given an organopolysiloxane having at least one polymerizable organic silicon radical represented by the general formula (2).

In carrying out each of the reactions described above, when necessary, an arbitrary amount of an inert organic solvent can be employed. Such a solvent is exemplified by ketones, e.g., methyl ethyl ketone, methyl isobutyl ketone; aromatic hydrocarbons, e.g., benzene, toluene and xylene; and chlorinated solvents, e.g., trichloroethylene, and tetrachloroethylene. For the purpose of conducting such a reaction with higher velocity and greater advantage, it is desirable that the temperature of the reaction system should be raised. In this case some thermal polymerization inhibitor had better be employed so that the unsaturated radical represented by the general formula (1) which is a polymerizable part in the unreacted compound represented by the general formula (12) may be protected, and the thermal polymerization inhibitor is selected from the group consisting of quinone derivatives such as hydroquinone and benzoquinone; and amine salts, hydrazine salts, aldehydes and ascorbic acid.

As a sensitizer to be added to the above-given photopolymerizable composition, any composition will do so long as it gets excited when it absorbs light, collides with the organopolysiloxane having a radical represented by the general formula (2) or (3), gives the excited energy to said organopolysiloxane, thereby accelerating the velocity of photopolymerization. Such a sensitizer is exemplified by amino-, nitro- and phenol compounds, e.g., p-hydrodiphenyl, p-nitroaniline, picramide, 2,6-dichloro-4-nitroaniline, 2,4-dinitrophenol; ketone compounds, e.g., benzaldehyde, acetophenone, p,p'-diamino-benzophenone, p,p'-tetramethyldiaminobenzophenone (Michler's ketone); quinone compounds, e.g., benzoquinone, anthraquinone, 1,2-naphthoquinone; anthrone compounds, e.g., 3-methyl-1,3-diazo-1,9-benzanthrone; dyes, e.g., malachite green, methylene blue, chrome green, rhodamine blue, azo green- TEG; pyrilium salts, e.g., 2,4,6-triphenylpyrilium perchlorate, 2,4,6-triphenyl-thiapyrilium perchlorate, 2,4,6-triphenyl-pyrilium-fluoborate, 2,4,6-triphenyl-thiapyrilium fluoborate. The amount of the sensitizer to be employed in the reaction can be arbitrary, but a satisfactory result will be obtained if from 0.05 to 5.0 percent by weight of the sensitizer based on the weight of the organosiloxane having at least one polymerizable organic silicon radical represented either by the general formula (2) or (3) is added to the reaction system.

To the photopolymerizable composition or the electron-ray polymerizable composition employed in practicing the method of the invention is added a solvent, chiefly in order to adjust the viscosity of the composition in application to the base plate or substrate. Said solvent is selected from the group consisting of ketones such as methyl ethyl ketone and methyl isobutyl ketone; aromatic hydrocarbons such as benzene, toluene, and xylene; and chlorinated hydrocarbons such as trichloroethylene and tetrachloroethylene.

To the photopolymerizable composition or the electron-ray-polymerizable composition mentioned above may be added, as diluents, besides said sovlent, such halogen-substituted hydrocarbons, alcohols, esters, or ethers, as are inert to organopolysiloxane having at least one radical represented by the general formula (2) or (3), as well as said thermal polymerization inhibitors and fillers usually added to electron-ray-polymerizable compositions. Any amounts of these additives may be added to the composition, but since the addition of the thermal polymerization inhibitor is made for the purpose of improving the storage stability (for the prevention of polymerization in the dark) and preventing the thermal polymerization of the composition due to the heat evolved by the drying of the solvent(s) when the composition has been applied to the base plate, it is preferable that the amount of the inhibitor is in the range of from about 0.1 to 0.001 percent by weight based on the weight of the organopolysiloxane having a radical represented by the general formula (2) or (3). To form the high-strength transparent coating film any or a variety of reinforcing silica fillers or other inorganic fillers may be employed at an amount of at most 30 parts per 100 parts of the organopolysiloxane. These reinforcing fillers must be at least 1$\mu$ in diameter so as to obtain well-cut on the edge of the image formed. Examples of the reinforcing fillers are precipitated silica, fumed silica, silica aerogel, calcium carbonate, calcium silicate, and refined clay. They can be treated with other organosilicon materials such as methyl chlorosilane, methyl alkoxysilane or methyl silazane.

As a positive pattern 3 employed in preparing the planographic printing plate of the present invention, either silver emulsion positive transparency or silver emulsion negative transparency can be used when the composition is of photopolymerizable one, and when the composition is of electron-ray-polymerizable one, a synthetic resin transparency on which has been laminated patterns of metal foil is employed, for example.

As to the light source necessary for the preparation of the planographic printing plate of the invention, it may be selected from the group of lamps giving off rays rich in ultraviolet rays, e.g., a xenon lamp, a low-pressure, medium-pressure or high-pressure mercury arc lamp, and as to the electron rays, any electron rays from any source can be employed at will. The exposure dose and the exposure time may be decided in consideration of the kind of the polymerizable composition applied to the base plate, and the thickness of the coating layer formed of it. Particularly when the coating layer is to be exposed to electron rays, if the thickness of the film is about 10$\mu$, electron rays at the accelerating voltage of at least 200 kv should be employed at 5 M rad or under, for example.

The planographic printing plate of the present invention is prepared by coating a plate or substrate 1 with the above-given polymerizable composition to form a coating layer on which is mounted in close contact a positive pattern 3, and then after being exposed to light or electron rays, it is developed, dried and thermally cured, thereby giving a photo-polymerized coating layer 2', which is superior in heat-, solvent-, and corrosion-resistance. Before the base plate or substrate coated with the polymerizable composition is exposed to light or electron rays, it had better be sealed, under reduced pressure, in a synthetic resin bag or else the exposure to light or electron rays of the thus treated base plate should be conducted in vacuo, so that the influence of oxygen contained in air may be minimized and the adhesion of the positive pattern to the coating layer of polymerizable composition may be further improved. When the exposure to electron rays of the plate is to be conducted in vacuo, electron beams can be employed, which brings about the advantage of doing away with the mounting of the positive pattern on the plate.

As a developing solution may be employed solvents such as aromatic hydrocarbons, chlorinated hydrocarbons and ketones, e.g., toluene, xylene, cyclohexane, methyl ethyl ketone, methyl isobutyl ketone, trichloroethylene, and tetrachloroethylene, either singly or in mixture.

The exact mechanism by which the coating layer in the exposed part is caused to harden to form non-image areas 2', and that in the unexposed part gets dissolved and washed away, has not yet been quite clear, but it may perhaps be that when the base plate or substrate coated with the polymer composition and dried is exposed to light or electron rays, the unsaturated radical represented by the general formula (1) and contained in organopolysiloxane having at least one polymerizable silicon radical represented by the general formula (2) or (3) and contained in the polymerizable composition in the exposed part gets excited by the energy evolved by the action taking place between the light and the sensitizer contained in the photopolymerizable composition or by the energy of the electron rays, thereby polymerizing the coating composition in the exposed part into a hard and insoluble film, but in the unexposed part, the unsaturated radical represented by the general formula (1) and contained in the organopolysiloxane having at least one polymerizable organic silicon radical represented by the general formula (2) or (3) is not affected by light or electron rays, so that it does not get polymerized but remains as it was when applied to the surface of the base plate, and easily flows away when washed with some solvent.

Figure 4:
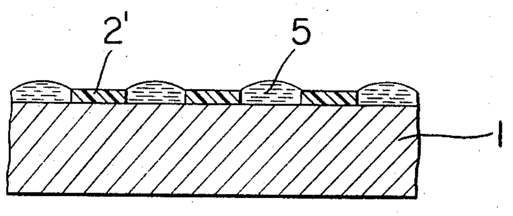

As shown in FIG. 3, the surface of the planographic printing plate of the invention consists of the surface of the polymerized hard film layer 2', in the non-image areas, prepared from photo- or electron-ray-polymerized composition containing as its main component at least one kind of Siloxane A, and the surface of the base plate or substrate 1 in the image areas. Said photo- or electron-ray polymerized hard polymer film is poor in adhesion and easily gets peeled off, so that as shown in FIG. 4, when ink is applied by roller to the plate surface, the adhesion between the ink and the non-image areas, vis., the polymerized hard film layer 2', is weaker than the cohesion between the ink and the roller or between the particles of the ink itself. Consequently, the ink is not transferred to the non-image areas but only to the surface of the base plate or substrate 1, forming an ink layer 5. Thus there will be no need of using dampening solutions usually required in lithography.

The planographic printing plate of the present invention can be prepared very easily as follows. First a base plate or substrate is coated with photo- or electron-ray-polymerizable composition, and with the positive pattern mounted on the coating layer of the polymerizable composition, it is exposed either to light or electron rays, and then developed and fixed. Therefore there is no difficulty in the industrial production of the plate. By the method of the invention, the images are directly formed of the coating layer on the base plate or substrate by utilizing the polymerizability, when exposed to light or electron rays, of the composition applied to the surface of the base plate. Consequently there is no fear of the edges of the images being chipped, or of the fidelity, the resolving power and the sharpness of the images being impaired.

Furthermore, on the surface of the planographic printing plate of the present invention there is exposed the surface of the base plate or substrate in the image areas, while in the non-image areas there is formed hard coating layer by the polymerization of Siloxane A. The difference in physical property between the two substances is so great that it will give excellent printability to the planographic printing plate of the invention.

A number of examples for reference will be given hereunder to show how Siloxane A is to be prepared, in which parts are all parts by weight.

REFERENCE 1.

247 parts of acryloxypropyltrichlorosilane were added dropwise over 1 hour interval to a mixture of 500 parts of water, 100 parts of toluene and 50 parts of isopropyl alcohol kept at 5°–10°C, and after the hydrochloric acid layer was separated, the siloxane toluene layer was washed with water until its pH became 6.8. To the latter layer was added 612 parts of dihydroxydimethylsilicone, represented by the general formula:

$$HO \left( \begin{array}{c} CH_3 \\ | \\ Si-O \\ | \\ CH_3 \end{array} \right)_n H$$

(where $n \approx 10,000$), 0.5 part of potassium acetate, and 0.5 part of hydroquinone, and the mixture were reacted at 110°–115°C for 8 hours. From the reaction product was removed toluene by distillation under reduced pressure, obtaining 754 parts of a pale yellow, transparent, and solid polymerizable silicone compound in a 97 percent yield, whose pour point proved to be 45°C.

REFERENCE 2.

In a four-necked flask were put 2,500 parts of water, 500 parts of toluene and 50 parts of isopropyl alcohol, and the mixture was cooled and kept at 5°–10°C, to which was added dropwise a mixture of 74.8 parts of monomethyltrichlorosilane, 64.5 parts of dimethyldichlorosilane, 126.5 parts of diphenyldichlorosilane, 105.7 parts of monophenyltrichlorosilane, and 131 parts of γ-methacryloxypropyltrichlorosilane, over 1 hour interval, and after the dropping was over, the mixture was stirred for 30 minutes, and washed with water until its pH became 7.0. Subsequently, it was distilled under reduced pressure so that the siloxane concentration might be 50 percent. The siloxane thus prepared contained 3.0 percent of hydroxyl radical. To said siloxane were added 797 parts of diethoxy-γ-trifluoropropylmethylpolysiloxane, having an average molecular weight of 1,594, and represented by the general formula:

$$H_5C_2O \left( \begin{array}{c} CH_3 \\ | \\ Si-O \\ | \\ CH_3 \end{array} \right)_{10} \left( \begin{array}{c} CH_3 \\ | \\ Si-O \\ | \\ CH_2CH_2CF_3 \end{array} \right)_5 C_2H_5$$

1.0 part of paratoluenesulfonic acid, and 0.3 part of methoxyhydroquinone, as a polymerization inhibitor, and the mixture was heated at 110°C and stirred for 8 hours, and ethanol distilled was taken out by means of a distilling column with which the flask was equipped. After the reaction was over, 10 parts of sodium carbonate were added to the reaction product so that the neutralization reaction might be carried out at 80°C for 2 hours, and the neutralized product was cooled. Sodium paratoluene sulfonate and surplus sodium carbonate were removed by filtration, and further, toluene was removed by distillation under reduced pressure, and a solid silicone compound (1,174 parts), pale yellow and transparent, and having a pour point of 43°C was obtained in a 96 percent yield.

REFERENCE 3.

To 92 parts of siloxane (65 percent toluene concentration) employed in Reference 1 were added 276 parts of diacetoxymethylphenylsiloxane, represented by the general formula:

$$CH_3COO\!-\!\left(\begin{matrix}CH_3\\ |\\ Si\!-\!O\\ |\\ CH_3\end{matrix}\right)_m\!\left(\begin{matrix}C_6H_5\\ |\\ Si\!-\!O\\ |\\ C_6H_5\end{matrix}\right)_n\!-\!OC-CH_3$$

(where $m+n = 5,000$, and $n/m+n = 0.05$), 0.5 part of potassium acetate, and 0.5 part of hydroquinone, and the mixture was reacted just as in Reference 1 for 10 hours, while removing acetic acid byproduced. The product obtained in a 98 percent yield was 361 parts of a colorless, transparent and solid polymerizable compound, whose pour point proved to be 53°C.

REFERENCE 4.

To 329 parts of siloxane (50 percent toluene solution) employed in Reference 2 were added 845 parts of dichloro-γ-trifluoropropylmethylpolysiloxane, having an average molecular weight of 1,689 and represented by the general formula:

$$Cl\!-\!\begin{matrix}CH_3\\ |\\ Si\\ |\\ CH_3\end{matrix}\!-\!\left(O\!-\!\begin{matrix}CH_2CH_2CF_3\\ |\\ Si\\ |\\ CH_3\end{matrix}\right)_{10}\!-\!Cl$$

80 parts of pyridine, 329 parts of tetrahydrofuran, and were stirred at 80°–85°C for 4 hours. After the reaction was over, the reaction product was washed with water in order to remove pyridine hydrochloride and tetrahydrofuran, and then, it was subjected to distillation under reduced pressure so as to remove toluene. The product (1,067 parts) obtained in a 94 percent yield was a pale yellow, transparent and solid, polymerizable silicone compound, having a pour point of 35°C.

REFERENCE 5.

239 parts of disodium methylphenyl siliconate, having an average molecular weight of 2,386 and represented by the general formula:

$$Na\!-\!O\!-\!\left(\begin{matrix}CH_3\\ |\\ Si\!-\!O\\ |\\ CH_3\end{matrix}\right)_{10}\!\left(\begin{matrix}C_6H_5\\ |\\ Si\!-\!O\\ |\\ C_6H_5\end{matrix}\right)_8\!-\!Na$$

and 239 parts of toluene were put in a four-necked flask, and while the mixture was stirred at room temperature, 28 parts of γ-methacryloxytrichlorosilane were added to it dropwise over 1 hour interval. Even after the addition was over, the mixture was kept stirring for 8 hours so that the reaction might be carried out. When the reaction came to an end, the reaction product was washed with water until its pH became 7.0, and the toluene was removed by distillation under reduced pressure. 251 parts of the product obtained in a 96 percent yield was a polymerizable silicone compound having a pour point of 80°C.

REFERENCE 6

149 parts of monomethyltrichlorosilane, 280 parts of γ-methacryloxypropyltrichlorosilane, and 258 parts of diphenyldichlorosilane were put in a four-necked flask, and to the mixture were added 224 parts of methanol over 1-hour interval with stirring. After the addition was over, the mixture was heated to 98°C, while paying attention to the forming of hydrochloric acid, and then the temperature was lowered down to 50°C or under. Then to the reaction system were added 1.5 parts of ferric chloride, and the system was gradually heated, while paying attention to the generation of methyl chloride, so that the system might be reacted at 120°C for 5 hours. When no more methyl chloride was generated, 792 parts of toluene were added to the reaction product, which, subsequently, was washed with water until its pH became 7.0. When toluene was removed from the reaction product by distillation under reduced pressure, 775 parts of solid polymerizable silicone compound was obtained in a 95 percent yield. The pour point of the product proved to be 95°C.

REFERENCE 7.

500 parts of water, 74 parts of toluene, and 99 parts of n-butyl alcohol were put in a four-necked flask and cooled down to 10°C or under, and to the mixture was added dropwise a mixture of 74 parts of dimethyldichlorosilane, 101 parts of diphenyldichlorosilane, 21 parts of monophenyltrichlorosilane, and 29 parts of γ-methacryloxypropyltriethoxysilane over 1 hour interval, and after the addition was over, the mixture was stirred for 30 more minutes and then was kept still so as to separate the layer of hydrochloric acid. The solvent layer was washed with water until its pH became 7–8, and when the washing came to an end, the layer was distilled under reduced pressure for the purpose of removing toluene, butyl alcohol and water involved. The product (160 parts) obtained in a 93 percent yield was a pale yellow, transparent polymerizable silicone compound with a pour point of 73°C.

REFERENCE 8.

115 parts of methylhydrogen dichlorosilane, 149 parts of monomethyltrichlorosilane, 211 parts of monophenyltrichlorosilane and 516 parts of dimethyldichlorosilane were added dropwise over 2 hour interval to a mixture of 1,000 parts of toluene, 100 parts of methanol and 5,000 parts of water, which mixture was kept stirring at 5°–10°C, and the reaction system was washed with water until its pH became 7.0, and then from the system was removed toluene by distillation under reduced pressure so that the siloxane concentration might be 50 percent. Subsequently, a mixture of 138 parts of allyl methacrylate, 0.2 part of a 2 percent isopropanol solution of chloroplatinic acid and 0.5 parts of hydroquinone was slowly added dropwise to the system, while paying attention to the generation of heat. When the addition was over, the mixture was heated to 80°C, at which it was reacted for 10 hours. When the reaction came to an end, unreacted substances and toluene were removed by distillation under reduced pressure, obtaining in a 95 percent yield, 628 parts of a solid polymerizable silicone compound whose pour point proved to be 48°C.

REFERENCE 9.

A mixture of 198 parts of γ-chloropropyl trimethoxysilane, and 91 parts of γ-chloropropyl methyldichlorosilane was added dropwise over 1 hour interval to a mixture of 200 parts of toluene, 500 parts of water and 50 parts of isopropyl alcohol kept stirring at 5°–10°C, and after the addition, the reaction system was washed with water until its pH became 7.0 so that the siloxane layer might be separated. To this layer was added at room temperature 257 parts of sodium cinnamate, and the mixture was reacted at 80°C for 5 hours. When sodium chloride and unreacted substances were removed by filtration, and toluene by distillation under reduced pressure, 32o parts of a pale yellow, tranaparent and solid polymerizable silicone compound were obtained. The pour point of the product proved to be 95°C.

REFERENCE 10.

830 parts of a toluene solution of siloxane, employed in Reference 8 were added dropwise over 1 hour interval to a mixture of 285 parts of allyl glycidyl ether, 0.5 part of a 2 percent butanol solution of chloroplatinic acid, and 0.5 part of hydroquinone kept at 80°C, and the mixture was reacted for 8 hours more. After the reaction was over, the reaction system was cooled down to 50°C, and to it were added 375 parts of cinnamic acid, and 2.5 parts of tin tetrachloride, and were kept at the same temperature for another 10 hours. When the reaction came to an end, unreacted substances and toluene were removed by distillation under reduced pressure and by filtration, obtaining, in a 93 percent yield, 999 parts of a polymerizable solid silicone whose pour point proved to be 60°c.

REFERENCE 11

149 parts of monomethyltrichlorosilane, 253 parts of diphenyldichlorosilane, 129 parts of dimethyldichlorosilane, and 106 parts of monophenyltrichlorosilane were put in a four-necked flask, equipped with an HCl absorbing apparatus, and while they were stirred, 63 parts of water were added dropwise to the mixture over 1 hour interval at 10°C. or under. Then the temperature was gradually raised and HCl formed was removed out of the system. The stirring at 110°C of the mixture was continued for 3 more hours until there was no more formation of HCl, when the temperature was lowered to 50°C, at which 255 parts of sodium cinnamate were added to the mixture and were stirred for 5 hours. After the reaction was over, sodium chloride formed was removed by filtration and toluene and unreacted substances by distillation under reduced pressure. The product thus obtained in a 95 percent yield (594 parts) was a polymerizable organopolysiloxane, solid, pale yellow and transparent, whose pour point was 95°C.

REFERENCE 12

740 parts of octamethylcyclodimethylsiloxane, 0.89 part of dimethyldicinnamoyloxysilane, and 37 parts of acid clay were put in a three-necked flask, and were heated and stirred, and then were kept at 110°C. for 24 hours. Subsequently the mixture was cooled, and after diluted with 740 parts of toluene, the acid clay and the unreacted substances were removed by filtration and toluene by distillation under reduced pressure. The product obtained in a 96 percent yield (710 parts) was a rubbery ray-polymerizable organopolysiloxane.

REFERENCE 13

740 parts of dimethoxydimethylpolysiloxane $$CH_3-O\left(\begin{array}{c}CH_3\\ |\\ Si\\ |\\ CH_3\end{array}-O\right)_n CH_3 \qquad n = 5,000$$

1,110 parts of toluene, 50 parts of cinnamic acid, 0.1 part of potassium acetate, and 0.05 part of hydroquinone were put in a flask, equipped with a distilling column, and after the mixture was heated and stirred, it was kept at 110°–120°C, and while methanol formed was removed out of the system by fractional distillation by means of the distilling column, the mixture was reacted for 24 hours. When the reaction was over, toluene and the unreacted substances were removed by distillation under reduced pressure, whereupon there was given a rubbery organopolysiloxane in a 95 percent yield (703parts).

REFERENCE 14.

To a mixture of 200 parts of monophenyltrichlorosilane, 50 parts of dimethyldichlorosilane, 100 parts of diphenyldichlorosilane, 350 parts of toluene, and 50 parts of methyl ethyl ketone, kept at 5°–10°C, were added dropwise 35 parts of water, and after HCl formed and the unreacted silane, tolune and methyl ethyl ketone were removed from the system by distillation under reduced pressure, the residue was cooled to 50°C, and 159 parts of toluene mixed with it. The mixture was kept at 50°C and 30 parts of sodium cinnamate were added to it. After 4-hour-reaction was over, sodium chloride and the unreacted sodium cinnamate were removed from the system by filtration, and toluene by distillation under reduced pressure, whereupon there were given 160 parts of a solid polymerizable organopolysiloxane, having a pour point of 68°C.

REFERENCE 15.

150 parts of silane, like the one employed in Reference 14, and 150 parts of toluene were mixed and kept at 50°C, to which were added 50 parts of sodium cinnamate and the mixture was stirred for 8 hours to carry out reaction. After the reaction was over, the mixture was cooled, and from the system the unreacted sodium cinnamate was removed by filtration and toluene by distillation under reduced pressure, whereupon there were given 168 parts of a polymerizable organopolysiloxane having a pour point of 70°C.

REFERENCE 16.

A mixture of 376 parts of α,ω-dichlorodimethylpolysiloxane $$Cl \leftarrow \overset{CH_3}{\underset{CH_3}{Si}} - O \rightarrow_{49} \overset{CH_3}{\underset{CH_3}{Si}} - Cl$$

212 parts of phenyltrichlorosilane and 250 parts of toluene was added dropwise to 250 parts of toluene, 118 parts of isopropylalcohol, and 1180 parts of water, kept at 5°–10°C, and after the addition was over, the mixture was stirred at 20°C for 30 minutes. A siloxane layer given was washed three times with a 2 percent aqueous solution of sodium sulfate, and after the reamining water was removed as the toluene azeotrope, 50 parts of ζ-methacryloxypropyltrimethoxysilane, 0.2 part of 2–6 ditertiary butylhydroxytoluene as a polymerization inhibitor, and 0.2 part of zinc octoate were added to the siloxane to be reacted for 8 hours in the refluxing toluene, after which toluene was removed by distillation under reduced pressure, whereupon there was given in a 97 percent yield (519 parts) and polymerizable organopolysiloxane, having a pour point of 85°C.

REFERENCE 17.

To 907 parts of a 55 percent toluene solution of hydrolyzed siloxane, like the one employed in Reference 16, were added 63 parts of ζ-cinnamoyloxybutylmethyldimethoxysilane, 0.2 part of methoxyhydroxyhydroquinone, and 0.2 part of dibutyltin-dilaurate, and were reacted for 8 hours in a reflux of toluene. Methanol formed was removed from the system together with toluene, and the still remaining toluene was taken out by distillation under reduced pressure. The product obtained in a 96 percent yield (530 parts) was a polymerizable organopolysiloxane, solid at room temperature.

REFERENCE 18.

A mixture of 384 parts of α,ω-dichloromethylpolysiloxane $$Cl \leftarrow \overset{CH_3}{\underset{CH_3}{Si}} - O \rightarrow_{10} \overset{CH_3}{\underset{CH_3}{Si}} - Cl$$

212 parts of phenyltrichlorosilane and 250 parts of toluene was added dropwise over a 1 hour interval to a mixture of 250 parts of toluene, 125 parts of isopropylalcohol, and 1250 parts of water, kept at 20°–35°C, to be hydrolyzed, and after the hydrolysis product was stirred at 35°C for 1 hour, the siloxane layer given was washed with water so that its pH value might be 6.9, and the water contained in it was removed as an azeotrope. Then 97 parts of cinnamoyloxymethyltriethoxysilane, 0.1 part of methoxyhydroquinone, and 0.2 part of dibutyltin-dioctoate were added to the washed siloxane to be reacted for 14 hours, while ethanol formed was removed. When toluene was removed from the reaction product by distillation under reduced pressure, a polymerizable organopolysiloxane, having a little fluidity, was given in a 97 percent yield (547 parts).

REFERENCE 19.

569 parts of dichlorodimethylpolysiloxane $$Cl \leftarrow \overset{CH_3}{\underset{CH_3}{Si}}O \rightarrow_{20} \overset{CH_3}{\underset{CH_3}{Si}} - Cl$$

370 parts of phenyltrichlorosilane, and 128parts of γ-bromopropyltrichlorosilane were dissolved in 434 parts of toluene, and the solution was added dropwise over a 2 hour interval to a mixture of 434 parts of toluene, 213 parts of isopropyl alcohol, and 2130 parts of water, kept at 10°–20°C, and even after the addition was over, the mixture was stirred at 20°C for 30 minutes more. Then a siloxane layer given was washed with water to make a pH of 7, and the water contained in the system was removed as the toluene azeotrope. To the siloxane were added 0.2 part of 2,6-ditertiary-butylhydroxytoluene, 30 parts of triethylamine, and 128 parts of sodium cinnamate, and were reacted at 110°–115°C for 8 hours. When toluene was removed by distillation under reduced pressure from the solution, which had been separated by filtration from the reaction product, there was given in a 94 percent yield (846 parts) of a polymerizable organopolysiloxane, having a pour point of 65°C.

REFERENCE 20.

To 1,446 parts of a 60 percent toluene solution of hydrolyzed siloxane, like the one employed in Reference 19, were added 0.2 part of hydroquinone, 3 parts of triethylamine hydrochloride, and 93 parts of potassium methacrylate and were reacted at 120°C for 8 hours. When potassium chloride formed and the unreacted potassium methacrylate were removed from the reaction product by filtration and toluene by distillation under reduced pressure, there was given a polymerizable silicone compound in a yield of 95 percent (827 parts), having a pour point of 55°C.

REFERENCE 21.

A mixture of 486 parts of trichlorophenyl methylpolysiloxane $$C_6H_5 - Si \leftarrow O - \overset{CH_3}{\underset{CH_3}{Si}} \rightarrow_{30} Cl_3$$

254 parts of phenyl trichlorosilane and 313 parts of toluene was added dropwise with stirring to a mixture of 313 parts of toluene, 148 parts of isopropyl alcohol and 1,480 parts of water in a four-necked flask, kept at room temperature, and after the addition was over, the mixture was further stirred at 30°C for 30 minutes. From the reaction product a water layer was removed, and the remaining reaction product was washed with a 2 percent aqueous solution of sodium sulfate three times. Water still contained in the residue was separated as the toluene azeotrope. Hydroxyl radical contained in the siloxane thus prepared proved to be 2.4 percent by weight. To the toluene solution of siloxane were added 152 parts of triethylamine and to the mixture were added dropwise 75 parts of methyltrichlorosilane, dissolved in 130 parts of toluene, and were stirred for 1 hour. To the mixture thus prepared were added 130 parts of methacryloxyethyl alcohol to be reacted at 50°C for 2 hours. After the reaction was over, from the reaction product were removed triethylamine hydrochloride by filtration and toluene by distillation under reduced pressure, and there was given a polymerizable organopolysiloxane, soft and rubbery, in a yield of 91 percent (665 parts).

REFERENCE 22.

To 620 parts of a 50 percent toluene solution of hydrolyzed siloxane, having 2.4 percent by weight of hydroxyl radical, line the one employed in Reference 21, were added 35 parts of pyridine, and to the mixture were added dropwise 75 parts of methyltrichlorosilane, dissolved in 100 parts of toluene, to be reacted at 50°C for 1 hour. To the reaction product were added 200 parts of sodium cinnamate, and when amine hydrochloride, sodium chloride and the unreacted sodium cinnamate were removed by filtration and toluene by distillation under reduced pressure, there was given in a 92 percent yield (453 parts) a polymerizable organopolysiloxane polysiloxane as a solid.

REFERENCE 23.

A mixture of 751 parts of α,ω-dichlorodimethylpolysiloxane, $$Cl\left(\begin{matrix}CH_3\\ |\\ Si\\ |\\ CH_3\end{matrix} - O\right)_{49}\begin{matrix}CH_3\\ |\\ Si\\ |\\ CH_3\end{matrix} - Cl$$

423 parts of phenyltrichlorosilane, and 1,000 parts of metnyl ethyl ketone was stirred, and then it was put in a four-necked flask, equipped with a gas-cooling tube, a thermometer, and a dropping funnel, and was cooled to 5°C. To the mixture was added dropwise a mixture of 25 parts of water and 52 parts of acetone, and was stirred at 50°C for 1 hour, while hydrochloric acid formed was removed from the system, which then was cooled to 10°and was mixed with 120 parts of sodium cinnamate. From the reaction product, sodium chloride formed was removed by filtration and methyl ethyl ketone by distillation, and there was given, as a solid at room temperature, a polymerizable organopolysiloxane in a 94 percent yield (1,020 parts).

REFERENCE 24.

1,000 parts of a 50 percent methyl ethyl ketone solution of partially hydrolyzed siloxane, synthesized like the one given in Reference 23 were cooled to 10°C, and to it were added dropwise 85 parts of glycidylmethacrylate with stirring. After the reaction was over, 10 parts of ethylene oxide were blown through the reaction product. When methyl ethyl ketone and excess ethylene oxide were removed by distillation under reduced pressure, there was given in a 97 percent yield (567 parts) a polymerizable organopolysiloxane which was soft and rubbery.

In the examples given below, which will describe the invention in greater detail, parts are all parts by weight.

EXAMPLE 1.

To the organopolysiloxane prepared as in Reference 1, were added a sensitizer and a solvent as follows:

| | |
|---|---|
| Organopolysiloxane prepared as in Reference 1 | 100 parts |
| 4,4'-bis-(dimethylamino)-benzophenone | 4 parts |
| Toluene | 1,000 parts |

and the mixture was applied about 5μ thick (when dried) by revolution coating to an aluminum plate, defatted with an alkali and treated with chromic acid, and then the coated plate was dried at 80°C for 10 minutes.

On the thus-treated aluminum plate was mounted in close contact a positive pattern, and was exposed under reduced pressure to the light from a 3,000 W xenon lamp placed 50 cm away for 2–4 minutes. Then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm, had an excellent releasability, and the offset ink was repelled from the areas covered with it, so that no dampening solution was required in using the plate for printing.

To 100 parts of the silicon compound prepared as in Reference 1 were added 1,000 parts of toluene, and the mixture was applied about 5μ thick (when dried) by revolution coating to an aluminum plate, defatted with an alkali and treated with chromic acid. Then the coated plate was dried at 80°C for 10 minutes.

On the thus treated aluminum plate was mounted in close contact a positive pattern, and was exposed under reduced pressure to the electron rays of 1 M rad. Then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm, had an excellent releasability and the offset ink was repelled from the areas covered with it, so that no dampening solution was required in using the plate for printing.

EXAMPLE 2.

To the organopolysiloxane prepared as in Reference 2 were added a sensitizer and a solvent as follows:

| | |
|---|---|
| Organopolysiloxane prepared as in Reference 2 | 100 parts |
| 5-nitroacenaphthene | 4 parts |
| Toluene | 1,000 parts |

and the mixture was applied about 5μ thick (when dried) by revolution coating to a zinc plate, defatted with an alkali and treated with chromic acid, and then the plate was dried to 80°C for 10 minutes.

On the thus treated zinc plate was mounted in close contact a positive pattern, and exposed under reduced pressure to the light from a 3,000 W xenon lamp placed 50 cm away for 3–4 minutes. The plate was then developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with the critical surface tension of about 21 dyn/cm, had an excellent releasability, and the offset ink was repelled from the areas covered with it, and therefore no dampening solution was required in using the plate for printing.

To 100 parts of the silicone compound prepared as in Reference 2 were added 350 parts of xylene, and the mixture was applied about 5μ thick (when dried) by revolution coating to an aluminum plate, defatted with an alkali and treated with chromic acid, and then the coated plate was drued at 80°C for 10 minutes.

On the thus treated aluminum plate was mounted in close contact a positive pattern, and was exposed under reduced pressure to electron rays of 1 M rad. Then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm had an excellent releasability, and the offset ink was repelled from the areas covered with it, so that no dampening solution was required in using the plate for printing.

EXAMPLE 3.

To the organopolysiloxane prepared as in Reference 3 were added a sensitizer and a solvent as follows.

| | |
|---|---|
| Organopolysiloxane prepared as in Reference 3 | 100 parts |
| 4,4'-bis-(dimethylamino)-benzophenone | 4 parts |
| Toluene | 1,000 parts |

and the mixture was applied about 5μ thick (when dried) by revolution coating to an aluminum plate, defatted with an alkali and treated with chromic acid, and then the coated plate was dried at 80°C for 10 minutes.

On the thus treated aluminum plate was mounted in close contact a positive pattern, and was exposed under reduced pressure to a 800 W super-high-voltage mercury arc lamp placed 40 cm away for 20–30 seconds. Then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm, had an excellent releasability and the offset ink was repelled from the areas covered with it, and therefore no dampening solution was required in using the plate for printing.

To 100 parts of the silicone compound prepared as in Reference 3 were added 1,000 parts of xylene and the mmixture was applied about 5μ thick (when dried) by revolution coating to an aluminum plate, defatted with an alkali and treated with chromic acid, and then the coated plate was dried at 80°C for 10 minutes.

On the thus treated plate was mounted in close contact a positive pattern, and was exposed to electron rays of 0.8 M rad; then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm, had an excellent releasability, and the offset ink was repelled from the areas covered with it, so that no dampening solution was required in using the plate for printing.

EXAMPLE 4.

To the organopolysiloxane prepared as in Reference 6 were added a sensitizer and a solvent as follows:

| | |
|---|---|
| Organopolysiloxane prepared as in Reference 6 | 100 parts |
| 5-nitroacenaphthene | 4 parts |
| Toluene | 1,000 parts |

and the mixture was applied about 5μ thick (when dried) by revolution coating to an aluminum plate, defatted with an alkali and treated with chromic acid, and then the coated plate was dried at 80°C for 10 minutes.

On the thus treated aluminum plate was mounted in close contact a positive pattern, and was exposed under reduced pressure to the light from a 3,000 W xenon lamp placed 50 cm away for 3–4 minutes; then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm, had an excellent releasability and the offset ink was repelled from the areas covered with it, and therefore no dampening solution was required in using the plate for printing.

To 100 parts of the silicone compound prepared as in Reference 6 were added 1,000 parts of methyl ethyl ketone, and the mixture was applied about 5μ thick (when dried) by revolution coating to an aluminum plate, defatted with an alkali and treated with chromic acid, and then the coated plate was dried at 80°C for 10 minutes.

On the thus treated aluminum plate was mounted in close contact a positive pattern, and was exposed under reduced pressure to electron rays of 0.7 M rad; then the plate was developed with a developing solution consisting 0f 100 parts of toluene and 150 parts of cyclohexane, and was thermally fixed in a 200°C oven for 20 minutes: whereupon there was given a planographic printing plate whose non-image areas were covered with a cured film of the composition described above. The film with a critical surface tension of about 21 dyn/cm, had an excellent releasability, and the offset ink was repelled from the areas covered with it, so that no dampening solution was required in using the plate for printing.

EXAMPLE 5.

To the organopolysiloxane prepared as in Reference 8 were added a sensitizer and a solvent as follows:

| | |
|---|---|
| Organopolysiloxane prepared as in Reference 8 | 100 parts |
| 5-nitroacenaphthene | 4 parts |
| Silica aerogel (Trade name: Santocel-c) | 5 parts |
| Toluene | 1,000 parts |

and the mixture was applied about 5$\mu$ thick (when dried) by revolution coating to an aluminum plate, defatted with an alkali and treated with chromic acid, and then the coated plate was dried at 80°C for 10 minutes.

On the thus treated aluminum plate was mounted in close contact a positive pattern, and was exposed under reduced pressure to the light from a 3,000 W xenon lamp placed 50 cm away for 3–4 minutes; then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film with a critical surface tension of about 21 dyn/cm, had an excellent releasability and the offset ink was repelled from the areas covered with it, and therefore no dampening solution was required in using the plate for printing.

To 100 parts of the silicone compound prepared as in Reference 8 were added 5 parts of silica aerogel and 400 parts of xylene, and the mixture was applied about 5$\mu$ thick (when dried) by revolution coating to an aluminum plate, defatted with an alkali and treated with chromic acid, and then the coated plate was dried at 80°C for 10 minutes.

On the thus treated aluminum plate was mounted in close contact a positive pattern, and was exposed under reduced pressure to electron rays of 1.3 M rad; then the plate was developed with a developing solution consisting of 100 parts of toluene and 150 parts of cyclohexane, and was thermally fixed in a 200°C oven for 20 minutes; thereupon there was given a planographic printing plate whose non-image areas were covered with a cured film of the composition described above. The film, with a critical surface tension of about 21 dyn/cm, had an excellent releasability, and the offset ink was repelled from the areas covered with it, so that no dampening solution was required in using the plate for printing.

EXAMPLE 6.

To the organopolysiloxane prepared as in Reference 11 were added a sensitizer and a solvent as follows:

| | |
|---|---|
| Organopolysiloxane prepared as in Reference 11 | 100 parts |
| 4,4'-bis-(dimethylamino)-benzophenone | 4 parts |
| Fumed silica (trade name: Aerosil-R-972) | 5 parts |
| Toluene | 1,000 parts |

and the mixture was applied 5$\mu$ thick (when dried) by revolution coating to an aluminum plate, defatted with an alkali and treated with chromic acid, and then the coated plate was dried at 80°C for 10 minutes.

On the thus treated aluminum plate was mounted in close contact a positive pattern, and was exposed under reduced pressure to the light from a 3,000 W xenon lamp placed 50 cm away for 3–4 minutes; then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm, had an excellent releasability and the offset ink was repelled from the areas covered with it, and therefore no dampening solution was required in using the plate for printing.

To 100 parts of the silicone compound prepared as in Reference 11 were added 5 parts of fumed silica and 1,000 parts of benzene, and the mixture was applied about 5$\mu$ thick (when dried), by revolution coating, to an aluminum plate, defatted with an alkali and treated with chromic acid, and them the coated plate was dried at 80°C for 10 minutes.

Then, a surface of the thus treated aluminum plate was irradiated with electron beam under the following conditions thereby to draw a image on it.

| | |
|---|---|
| Accelerating voltage | 30 kV |
| Exposure current | $1 \times 10^{-8}$ Amp. |
| Beam scanning frequency | 50 Hz |
| Exposure width | 10 $\mu$ |
| Degree of vacuum | $5 \times 10^{-7}$ mmHg |

Thereupon, the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm, had an excellent releasability, and the offset ink was repelled from the areas covered with it, so that no dampening water was required in using the plate for printing.

EXAMPLE 7.

To the organopolysiloxane prepared as in Reference 16 were added a sensitizer and a solvent as follows:

| | |
|---|---|
| Organopolysiloxane prepared as in | 100 parts |
| 4,4'-bis-(dimethylamino)-benzophenone | 4 parts |
| Toluene | 1,000 parts |

and the mixture was applied about 5$\mu$ thick (when dried) by revolution coating to an aluminum plate, defatted with an alkali and treated with chromic acid, and then the coated plate was dried at 80°C for 10 minutes.

On the thus treated aluminum plate was mounted in close contact a positive pattern, and was exposed under reduced pressure to the light from a 3,000 W xenon lamp placed 50 cm away for 3–4 minutes; then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm, had an excellent releasability and the offset ink was repelled from the areas covered with it, and therefore no dampening solution was required in using the plate for printing.

To 10 parts of the silicone compound prepared as in Reference 16 were added 1,000 parts of toluene, and the mixture was applied about 5μ thick (when dried) by revolution coating to an aluminum plate, defatted with an alkali and treated with chromic acid, and then the plate was dried at 80°C for 10 minutes.

On the thus treated aluminum plate was mounted in close contact a positive pattern, and was exposed under reduced pressure to electron rays of 0.7 M rad; then the plate was developed with a developing solution consisting of 100 parts of toluene and 150 parts of cyclohexane, and was thermally fixed in a 200°C oven for 20 minutes, whereupon there was given a planographic printing plate whose non-image areas were covered with a cured film of the composition described above. The film, with a critical surface tension of about 21 dyn/cm, had an excellent releasability, and the offset ink was repelled from the areas covered with it, so that no dampening solution was required in using the plate for printing.

EXAMPLES 8 – 43.

Employing the organopolysiloxanes prepared as in References 4, 5, 7, 9, 10, 12–15, and 17–24, and the materials given in the following tables, experiments were conducted as described in Examples 1–7, under the conditions given in the following tables. In every case there was given a planographic printing plate whose non-image areas were covered with a cured film of the composition comprising the above-given materials and containing said organopolysiloxane as its main component, and in whose use no dampening solution was required. In each case, the plate was developed with a developing solution consisting of toluene and cyclohexane mixed in the ratio of 100:150, and the fixing was conducted at 200°C for 20 minutes.

| Example No. | Base plate | Kind & amount of photo- or electron-ray-polymerizable silicone | Kind & amount of sensitizer | Kind & amount of solvent | Condition under which the plate was exposed to light: Light source | Time (min) | Distance (cm) | Exposure dose in the case of electron rays |
|---|---|---|---|---|---|---|---|---|
| 8 | Aluminum plate | Organopolysiloxane prepared as in Ref. 4 100 pts. | 5-nitro acenaphthene 4 pts. | Toluene 1,000 pts. | 3,000 W xenon lamp | 3–4 | 50 | |
| 9 | Aluminum plate | Organopolysiloxane prepared as in Ref. 4 100 pts. | — | Benzene 300 pts. | | | | 1 M rad. |
| 10 | Zinc plate | Organopolysiloxane prepared as in Ref. 5 100 pts. | 4,4'-bis (dimethyl amino)-benzophenone 4 pts. | Toluene 1,000 pts. | 3,000 W xenon lamp | 3–4 | 50 | |
| 11 | Aluminum plate | Organopolysiloxane prepared as in Ref. 5 100 pts. | — | Benzene 1,000 pts. | | | | 1.2 M rad. |
| 12 | Aluminum plate | Organopolysiloxane prepared as in Ref. 7 100 pts. | 4,4'-bis (dimethyl amino)-benzophenone 4 pts. | Toluene 1,000 pts. | 3,000 W xenon lamp | 3–4 | 50 | |
| 13 | Aluminum plate | Organopolysiloxane prepared as in Ref. 7 100 pts. | — | Toluene 700 pts. | | | | 1 M rad. |
| 14 | Copper plate | Organopolysiloxane prepared as in Ref. 9 100 pts | 4,4'-bis (dimethyl amino)-benzophenone 4 pts. | Toluene 1,000 pts. | 3,000 W xenon lamp | 3–4 | 50 | |
| 15 | Copper plate | Organopolysiloxane prepared as in Ref. 9 100 pts. | — | Toluene 1,000 pts. | | | | 0.9 M rad. |

–Continued

| Example No. | Base plate | Kind & amount of photo- or electron-ray-poly-merizable silicone | Kind & amount of sensi-tizer | Kind & amount of solvent | Condition under which the plate was exposed to light | | | Exposure dose in the case of electron rays |
|---|---|---|---|---|---|---|---|---|
| | | | | | Light source | Time (min) | Dis-tance (cm) | |
| 16 | Iron plate | Organo-poly-siloxane prepared as in Ref. 10 100 pts. | 5-nitro acenaph-thene 4 pts. | Toluene 1,000 pts. | 3,000 W xenon lamp | 3–4 | 50 | |
| 17 | Iron plate | Organo-poly-siloxane prepared as in Ref. 10 100 pts. | — | Methyl ethyl ketone 700 pts. | | | | 1 M rad. |
| 18 | Stainless steel plate | Organo-poly-siloxane prepared as in Ref. 12 100 pts. | 5-nitro acenaph-thene 4 pts. | Toluene 1,000 pts. | 3,000 W xenon lamp | 3–4 | 50 | |
| 19 | Stainless steel plate | Organo-poly-siloxane prepared as in Ref. 12 100 pts. | — | Methyl ethyl ketone 700 pts. | | | | 1 M rad. |
| 20 | Aluminum plate | Organo-poly siloxane prepared as in Ref. 13 100 pts. | 4,4′-bis (dimethyl amino)-benzo-phenone 4 pts. | Toluene 1,000 pts. | 3,000 W xenon lamp | 3–4 | 50 | |
| 21 | Aluminum plate | Organo-poly-siloxane prepared as in Ref. 13 100 pts. | — | Xylene 650 pts. | | | | 0.8 M rad. |
| 22 | Aluminum plate | Organo-poly-siloxane prepared as in Ref. 14 100 pts. | 5-nitro-acenaph-thene 4 pts. | Toluene 1,000 pts. | 3,000 W xenon lamp | 3–4 | 50 | |
| 23 | Aluminum plate | Organo-poly-siloxane prepared as in Ref. 14 100 pts. | — | Toluene 800 pts. | | | | 1.2 M rad. |
| 24 | Aluminum plate | Organo-poly-siloxane prepared as in Ref. 15 100 pts. | 4,4′-bis (dimethyl amino)-benzo-phenone 4 pts. | Toluene 1,000 pts. | 3,000 W xenon lamp | 3–4 | 50 | |
| 25 | Aluminum plate | Organo-poly-siloxane prepared as in Ref. 15 100 pts. | — | Benzene 650 pts. | | | | 0.9 M rad. |
| 26 | Aluminum plate | Organo-poly-siloxane prepared as in Ref. 17 100 pts. | 5-nitro-acenaph-thene 4 pts. | Toluene 1,000 pts. | 3,000 W xenon lamp | 3–5 | 50 | |
| 27 | Aluminum plate | Organo-poly-siloxane prepared as in Ref. 17 100 pts. | — | Xylene 600 pts. | | | | 1.3 M rad. |

–Continued

| Example No. | Base plate | Kind & amount of photo- or electron-ray-poly-merizable silicone | Kind & amount of sensi-tizer | Kind & amount of solvent | Condition under which the plate was exposed to light | | | Exposure dose in the case of electron rays |
|---|---|---|---|---|---|---|---|---|
| | | | | | Light source | Time (min) | Dis-tance (cm) | |
| 28 | Aluminum plate | Organo-poly-siloxane prepared as in Ref. 18 100 pts. | 4,4'-bis (dimethyl-amino)-benzo-phenone 4 pts. | Toluene 1,000 pts. | 800 W super-high-pressure arc lamp | 0.4–0.5 | 40 | |
| 29 | Aluminum plate | Organo-poly-siloxane prepared as in Ref. 18 100 pts. | — | Methyl ethyl ketone 350 pts. | | | | 1.5 M rad. |
| 30 | Aluminum plate | Organo-poly-siloxane prepared as in Ref. 19 100 pts. | 4,4'-bis (dimethyl amino)-benzo-phenone 4 pts. | Toluene 1,000 pts. | 3,000 W xenon lamp | 3–5 | 50 | |
| 31 | Aluminum plate | Organo-poly-siloxane prepared as in Ref. 19 100 pts. | — | Toluene 600 pts. | | | | 1.0 M rad. |
| 32 | Aluminum plate | Organo-poly-siloxane prepared as in Ref. 20 100 pts. | 4,4'-bis (dimethyl amino)-benzo-phenone 4 pts. | Toluene 1,000 pts. | 3,000 W xenon lamp | 3–5 | 50 | |
| 33 | Aluminum plate | Organo-poly-siloxane prepared as in Ref. 20 100 pts. | — | m-xylene 700 pts. | | | | 0.9 M rad. |
| 34 | Aluminum plate | Organo-poly-siloxane prepared as in Ref. 21 100 pts. | 4,4'-bis (dimethyl amino)-benzo-phenone 4 pts. | Toluene 1,000 pts. | 3,000 W xenon lamp | 3–5 | 50 | |
| 35 | Aluminum plate | Organopoly-siloxane prepared as in Ref. 21 100 pts. | — | Toluene 750 pts. | | | | 1.2 M rad. |
| 36 | Aluminum plate | Organopoly-siloxane prepared as in Ref. 22 100 pts. | 4,4'-bis (dimethyl amino)-benzo-phenone 4 pts. | Toluene 1,000 pts. | 3,000 W xenon lamp | 3–5 | 50 | |
| 37 | Aluminum plate | Organopoly-siloxane prepared as in Ref. 22 100 pts. | — | Xylene 650 pts. | | | | 1.2 M rad. |
| 38 | Aluminum plate | Organopoly-siloxane prepared as in Ref. 23 100 pts. | 4,4'-bis (dimethyl-amino)-benzo-phenone 4 pts. | Toluene 1,000 pts. | 3,000 W xenon lamp | 3–5 | 50 | |
| 39 | Aluminum plate | Organopoly-siloxane prepared as in Ref. 23 100 pts. | — | Methyl ethyl ketone 700 pts. | | | | 0.8 M rad. |
| 40 | Aluminum plate | Organopoly-siloxane prepared as in Ref. 24 100 pts. | 4,4'-bis (dimethyl amino)-benzo-phenone 4 pts. | Toluene 1,000 pts. | 3,000 W xenon lamp | 3–5 | 50 | |
| 41 | Aluminum plate | Organopoly-siloxane prepared as in Ref. 24 100 pts. | — | Xylene 700 pts. | | | | 1.0 M rad. |

What is claimed is:

1. A planographic printing plate comprising a base plate having ink-receptive and ink-repellent areas thereon, said ink-repellent area being constituted of a polymerized and cured layer which is produced by the steps of a. providing on the surface of said base plate a dried layer of a polymerizable and curable composition comprising A. an organopolysiloxane selected from the group of 1. organopolysiloxane having at least one polymerizable siloxane unit represented by the formula $$\underset{\substack{|\\R^1}}{HC}=\underset{\substack{|\\R^2}}{C}-\underset{\substack{\|\\O}}{C}-O-R^3-\underset{\substack{|\\R^4_a}}{Si}X_bO_{\frac{3-a-b}{2}}$$

where $R^1$ is hydrogen, phenyl or halogen-substituted phenyl, $R^2$ is hydrogen or methyl, $R^3$ is an unsubstituted or halogen-substituted divalent hydrocarbon, having from 1 to 10 carbon atoms, $R^4$ is an unsubstituted or halogen-substituted monovalent hydrocarbon, having from 1 to 10 carbon atoms, X is hydroxy or alkoxy having from 1 to 4 carbon atoms, $a$ is 0 or 1, and $b$ is 0, 1 or 2, with the proviso that $(a+b)$=0, 1 or 2, and 2. organopolysiloxane having at least one polymerizable siloxane unit represented by the formula $$\underset{\substack{|\\R^1}}{HC}=\underset{\substack{|\\R^2}}{C}-\underset{\substack{\|\\O}}{C}-O-(R^3-O)_l-\underset{\substack{|\\R^4_m}}{Si}X_nO_{\frac{3-m-n}{2}}$$

wherein $R^1$, $R^2$, $R^3$, $R^4$ and X are as defined above, l is 0 or 1 and $m$ and $n$ are 0, 1 or 2 with the proviso that $(m+n)$=0, 1 or 2, B. a photosensitizer, and C. a solvent, b. pressing a positive pattern onto the composition layer thus provided, c. subjecting the treated base plate to an imagewise exposure to actinic radiation from above said positive pattern, to polymerize and cure said composition layer in the exposed areas, d. subjecting the treated base plate to a development treatment to remove the unexposed areas to expose the surface of said base plate, and e. then fixing the images.

2. A planographic printing plate as claimed is claim 1, wherein said base plate is selected from the group consisting of copper plates, aluminum plates, stainless steel plates, zinc plates, iron plates, nickel-plated copper plates, nickel-plated iron plates, chromium-plated iron plates and plates of plastics.

3. A planographic printing plate as claimed in claim 1, wherein said organopolysiloxane comprises a group selected from the group consisting of acryloxy radical, methacryloxy radical, cinnamoyloxy radical and halogenated cinnamoyloxy radical.

4. A method for preparing a planographic printing plate which comprises the steps of applying to the surface of a base plate a layer of a polymerizable composition containing an organopolysiloxane having in its molecule an unsaturated radical represented by the general formula:

$$\underset{\substack{|\\R^1}}{HC}=\underset{\substack{|\\R^2}}{C}-\underset{\substack{\|\\O}}{C}-O-$$

wherein $R^1$ is a hydrogen atom or a phenyl radical or a halogen substituted phenyl radical and $R^2$ is a hydrogen atom or a methyl radical, pressing a positive pattern onto the composition layer, irradiating the treated base plate with lights or electron rays from above the positive pattern, subjecting it to developing treatment and then fixing the images.

5. A method for preparing a planographic printing plate which comprises the steps of applying to the surface of a base plate a layer of a polymerizable composition composed of (a) an organopolysiloxane having an unsaturated radical in its molecule represented by the general formula:

$$\underset{\substack{|\\R^1}}{HC}=\underset{\substack{|\\R^2}}{C}-\underset{\substack{\|\\O}}{C}-O-$$

wherein $R^1$ is a hydrogen atom or a phenyl radical or a halogen substituted phenyl radical and $R^2$ is a hydrogen atom or a methyl radical, (b) a photosensitizer and (c) a solvent, pressing a positive pattern onto the composition layer, irradiating the treated base plate with lights from the above positive pattern, subjecting it to developing treatment and then fixing the images.

6. A method for preparing a planographic printing plate which comprises the steps of applying to the surface of a base plate a layer of a polymerizable composition composed of (a) an organopolysiloxane having an unsaturated radical in its molecule represented by the general formula:

$$\underset{\substack{|\\R^1}}{HC}=\underset{\substack{|\\R^2}}{C}-\underset{\substack{\|\\O}}{C}-O-$$

wherein $R^1$ is a hydrogen atom or a phenyl radical or a halogen substituted phenyl radical and $R^2$ is a hydrogen atom or a methyl radical, (b) a photosensitizer, (c) a reinforcing filler and (d) a solvent, pressing a positive pattern onto the composition layer, irradiating the treated base plate with lights from above the positive pattern, subjecting it to developing treatment and then fixing the images.

7. A method for preparing a planographic printing plate which comprises the steps of applying to the surface of a base plate a layer of a polymerizable composition composed of (a) an organopolysiloxane having an unsaturated radical in its molecule represented by the general formula:

$$\overset{R^1}{\overset{|}{HC}} = \overset{R^2}{\overset{|}{C}} - \underset{O}{\underset{\|}{C}} - O -$$

wherein $R^1$ is a hydrogen atom or a phenyl radical or a halogen substituted phenyl radical and $R^2$ is a hydrogen atom or a methyl radical, and (b) a solvent, pressing a positive pattern onto the composition layer, irradiating the treated base plate with electron rays from above the positive pattern, subjecting it to developing treatment and then fixing the images.

8. A method for preparing a planographic printing plate which comprises the steps of applying to the surface of a base plate a layer of a polymerizable composition composed of (a) an organopolysiloxane having an unsaturated radical in its molecule represented by the general formula:

$$\overset{R^1}{\overset{|}{HC}} = \overset{R^2}{\overset{|}{C}} - \underset{O}{\underset{\|}{C}} - O -$$

wherein $R^1$ is a hydrogen atom or a phenyl radical or a halogen substituted phenyl radical and $R^2$ is a hydrogen atom or a methyl radical, (b) a reinforcing filler and (c) a solvent, pressing a positive pattern onto the composition layer, irradiating the treated base plate with electron rays from above the positive pattern, subjecting it to developing treatment and then fixing the images.

9. A method for preparing a planographic printing plate which comprises the steps of applying to the surface of a base plate a layer of a polymerizable composition composed of (a) an organopolysiloxane having an unsaturated radical in its molecule represented by the general formula:

$$\overset{R^1}{\overset{|}{HC}} = \overset{R^2}{\overset{|}{C}} - \underset{O}{\underset{\|}{C}} - O -$$

wherein $R^1$ is a hydrogen atom or a phenyl radical or a halogen substituted phenyl radical and $R^2$ is a hydrogen atom or a methyl radical, and (b) a solvent, drawing a pattern onto the composition layer by means of electron beam, subjecting it to developing treatment and then fixing the images.

10. A method for preparing a planographic printing plate which comprises the steps of applying to the surface of a base plate a layer of a polymerizable composition composed of (a) an organopolysiloxane having an unsaturated radical in its molecule represented by the general formula:

$$\overset{R^1}{\overset{|}{HC}} = \overset{R^2}{\overset{|}{C}} - \underset{O}{\underset{\|}{C}} - O -$$

wherein $R^1$ is a hydrogen atom or a phenyl radical or a halogen substituted phenyl radical and $R^2$ is a hydrogen atom or a methyl radical, (b) a reinforcing filler and (c) a solvent, drawing a pattern onto the composition layer by means of electron beam, subjecting it to developing treatment and then fixing the images.

11. The method claimed in claim 4, wherein said base plate is selected from the group consisting of copper plates, aluminum plates, stainless steel plates, zinc plates, iron plates, nickel-plated copper plates, nickel-plated iron plates, chromium-plated iron plates and plastics plates.

12. The method claimed in claim 4, wherein said unsaturated radical is selected from the group consisting of acryloxy radical, methacryloxy radical, cinnamoyloxy radical and halogenated cinnamoyloxy radical.

13. The method claimed in claim 4, wherein said organopolysiloxane has at least one polymerizable radical represented by the general formula:

$$\overset{R^1}{\overset{|}{HC}} = \overset{R^2}{\overset{|}{C}} - \underset{O}{\underset{\|}{C}} - O - R^3 - \overset{R^4}{\overset{|}{Si}}X_bO_{\frac{3-a-b}{2}}$$

wherein $R^1$ is a hydrogen atom or a phenyl radical or a halogen substituted phenyl radical; $R^2$ is a hydrogen atom or a methyl radical; $R^3$ is a divalent hydrocarbon radical or a halogen substituted divalent hydrocarbon radical, having from 1 to 10 carbon atoms; $R^4$ is a monovalent hydrocarbon radical or a halogen substituted monovalent hydrocarbon radical, having from 1 to 10 carbon atoms; X is a hydroxyl radical or an alkoxy radical having from 1 to 4 carbon atoms; $a$ is a number representing 0 or 1, and $b$ is also a number representing 0, 1 or 2, where $(a+b)=0$, 1 or 2.

14. The method claimed in claim 4, wherein said organopolysiloxane has at least one polymerizable radical represented by the general formula:

$$\overset{R^1}{\overset{|}{HC}} = \overset{R^2}{\overset{|}{C}} - \underset{O}{\underset{\|}{C}} - O ( R^3 - O )_{\ell} \overset{R^4_m}{\overset{|}{Si}}X_nO_{\frac{3-m-n}{2}}$$

wherein $R^1$ is a hydrogen atom or a phenyl radical or a halogen substituted phenyl radical; $R^2$ is a hydrogen atom or a methyl radical; $R^3$ is a divalent hydrocarbon radical, or a halogen substituted divalent hydrocarbon radical, having from 1 to 10 carbon atoms; $R^4$ is a monovalent hydrocarbon radical or a halogen substituted monovalent hydrocarbon radical, having from 1 to 10 carbon atoms; X is a hydroxyl radical or an alkoxy radical having from 1 to 4 carbon atoms; $l$ is a number representing 0 or 1, and $m$ and $n$ are a number representing 0, 1 or 2, where $(m+n)=0$, 1 or 2.

15. The method claimed in claim 6, wherein said reinforcing filler is selected from the group consisting of precipitated silica, fumed silica, silica aerogel, calcium carbonate, calcium silicate and refined clay.

16. The method claimed in claim 8, wherein said reinforcing filler is selected from the group consisting of precipitated silica, fumed silica, silica aerogel, calcium carbonate, calcium silicate and refined clay.

17. The method claimed in claim 10, wherein said reinforcing filler is selected from the group consisting of precipitated silica, fumed silica, silica aerogel, calcium carbonate, calcium silicate and refined clay.

* * * * *